United States Patent [19]

Betzig et al.

[11] Patent Number: 5,389,779

[45] Date of Patent: Feb. 14, 1995

[54] METHOD AND APPARATUS FOR NEAR-FIELD, SCANNING, OPTICAL MICROSCOPY BY REFLECTIVE, OPTICAL FEEDBACK

[75] Inventors: Robert E. Betzig, Chatham; Igal M. Brener, Eatontown; Stephen G. Grubb, Warren; David A. B. Miller, Fair Haven, all of N.J.

[73] Assignee: AT&T Corp., Murray Hill, N.J.

[21] Appl. No.: 99,681

[22] Filed: Jul. 29, 1993

[51] Int. Cl.6 .............................................. H01J 3/14
[52] U.S. Cl. ..................................... 250/216; 250/306
[58] Field of Search .................... 250/216, 27.26, 234, 250/306, 307, 309, 563; 356/121, 5, 152, 4, 124

[56] References Cited

U.S. PATENT DOCUMENTS 4,604,520  8/1986  Pohl ..................... 250/216
5,272,330 12/1993  Betzig et al. ............ 250/216

Primary Examiner—David C. Nelms
Assistant Examiner—Que T. Le
Attorney, Agent, or Firm—Martin I. Finston

[57] ABSTRACT

Apparatus and methods of near-field scanning optical microscopy (NSOM) are described. A sensing technique is used, in which a light source having an optical cavity is reflectively coupled to the sample surface. Changes in the surface properties of the sample at the sensed location alter the optical feedback in the light source. This leads to detectable changes in the output characteristics of the light source.

22 Claims, 6 Drawing Sheets

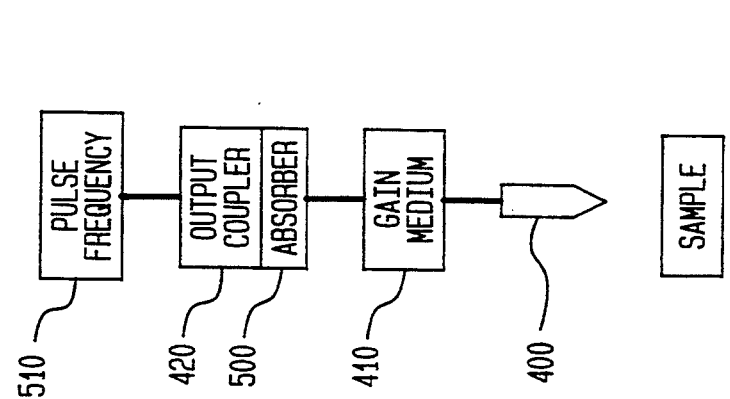
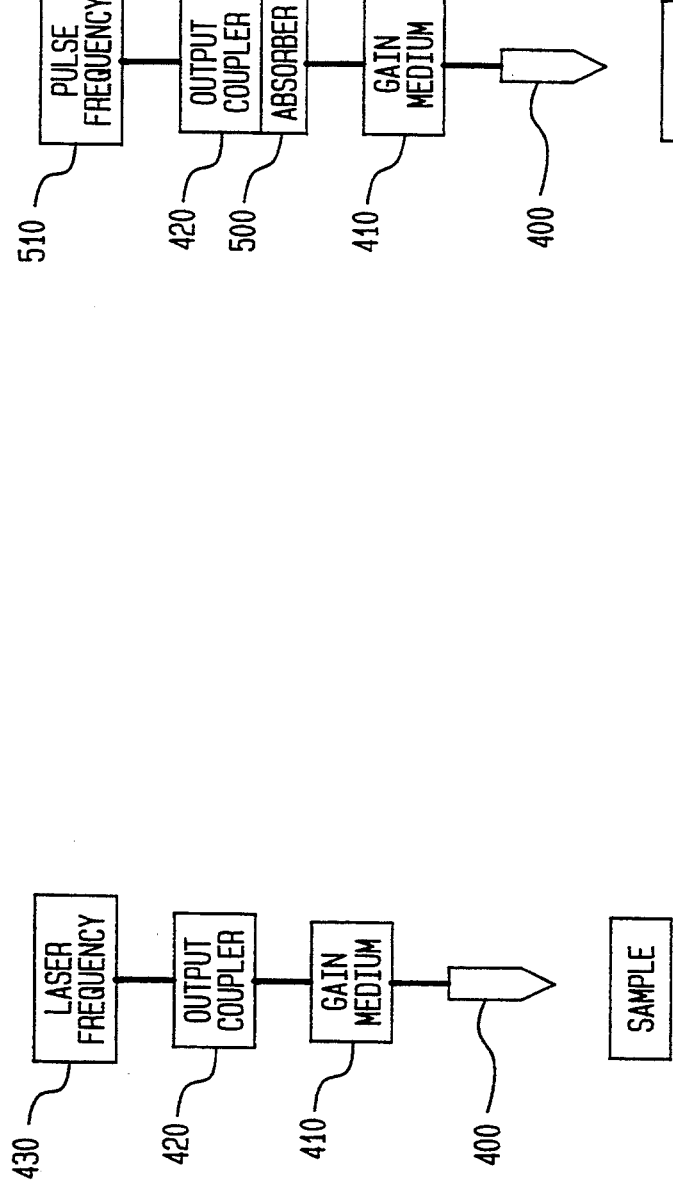

METHOD AND APPARATUS FOR NEAR-FIELD, SCANNING, OPTICAL MICROSCOPY BY REFLECTIVE, OPTICAL FEEDBACK

ART BACKGROUND

Recent advances have brought near-field scanning optical microscopy (NSOM) to the point where it can be applied routinely to a variety of samples. For example, the design and applications of a probe based on a metal-coated, tapered optical fiber are described in E. Betzig, J. K. Trautman, T. D. Harris, J. S. Weiner, and R. L. Kostelak, *Science* 25 1, 1468 (1991); E. Betzig, P. L. Finn, and J. S. Weiner, *Appl. Phys. Lett.* 60, 2484 (1992); and E. Betzig and J. K. Trautman, *Science* 257, 189 (1992). Nevertheless, further refinement of near-field probes remains an area of active interest. For example, the quantity and diversity of applications would be enhanced through the development of probes having increased photon flux. In the above-mentioned tapered fiber probe, the flux is limited, in large part, because the transmitted energy is exponentially attenuated in evanescent modes within the probe as the probe diameter tapers to dimensions substantially smaller than the wavelength. However, rather than imaging the sample directly via this comparatively weak emitted light, it is possible, in principle, to measure local properties of the sample by their influence on the boundary conditions at the emissive aperture of the probe and their consequent effect on the electromagnetic field within the probe itself. The problem then becomes one of measuring these field changes with sufficient speed and sensitivity to permit high bandwidth NSOM reflection-mode detection.

Reflective feedback probes have, in fact, been demonstrated for operation at heights greater than one wavelength above the sample surface. For example, U.S. Pat. No. 4,860,276, issued to H. Ukita, et al. on Aug. 22, 1989, describes an optical head which can be used for reading or writing digital data. This head, which is carded on a flying slider, includes a self-coupled semiconductor laser situated within several micrometers of the recording surface. The resulting spot size is about 1 μm in diameter, which, however,is not substantially smaller than spot sizes attainable using conventional focusing optics. Thus, the Ukita probe fails to combine the high resolution of near-field detection with the relatively high signal-to-noise ratios achievable by reflective feedback.

SUMMARY OF THE INVENTION

To achieve this, and in that way to achieve high bandwidth NSOM reflection-mode detection, we have developed a system in which the tip and aperture region of an NSOM probe serves as one end reflector of an optical cavity that includes an optically emissive medium. (For example, the emissive medium may be a $Nd^{3+}$ doped fiber laser continuous with the probe.) The field changes within the tip are then evidenced as small variations in the complex reflectivity at one end of the cavity. It is well known that these variations can result in substantial changes in the optical output characteristics of the emissive medium. For example, they may result in large changes in the output power from the opposite end of a fiber laser, particularly when the laser is operated near threshold.

BRIEF DESCRIPTION OF THE DRAWINGS

FIG. 10 is a schematic diagram of a system, according to one embodiment of the invention, for detection by modulation of the laser frequency v.

FIG. 11 is a schematic diagram of a system, according to one embodiment of the invention, for detection by passively modelocking the laser.

With reference to FIG. 1, a typical NSOM system includes a probe 105, means 102 for situating emissive face portion 103 of the probe near the sample surface, and means 104 for scanning the probe over the surface. Emmissive face portion 103 has a maximum extent L in a least one dimension parallel to the sample surface that is less than the imaging wavelength λ. The situating means 102, in use, situate portion 103 at a distance from the sample surface that is less than or approximately equal to L.

DETAILED DESCRIPTION OF A PREFERRED EMBODIMENT

Figure 1:
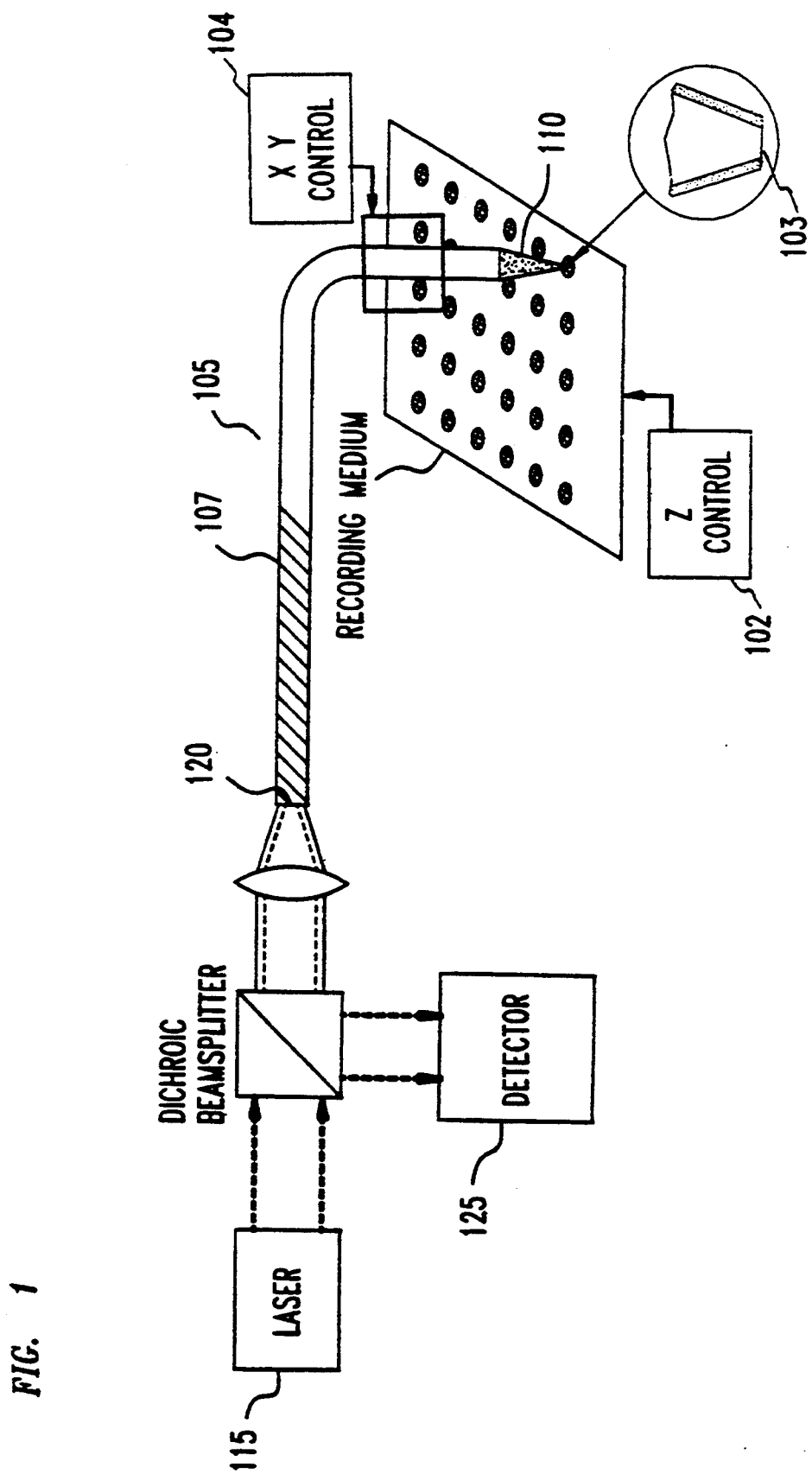
FIG. 1 schematically shows an illustrative configuration for a reflection-mode NSOM system using a fiber laser probe according to the invention in one embodiment.

With further reference to FIG. 1, we created a hybrid, near-field, fiber laser probe 105 having a laser gain region 107 by drawing a single mode, $Nd^{3+}$ doped optical fiber in a pipette puller and applying an aluminum coating 110 according to the procedure for making passive fiber probes described in E. Betzig, J. K. Trautman, T. D. Harris, J. S. Weiner, and R. L. Kostelak, Science 251, 1468 (1991). The fiber used had a Δ of about 1%, and a 3.4-μm-diameter core uniformly doped with $Nd^{3+}$ ions, resulting in a measured attenuation at the pump wavelength (753 nm) of 0.89 dB/cm. Pump light at 753 nm from a $Kr^+$ laser was coupled into the cleaved end 120, and the resulting 1060-nm laser emission was measured at this same end by detector 125 after isolation from the pump, as shown in the figure. A near-field scan head incorporating shear force feedback was used to maintain the tapered end of the probe within the near field, and was controlled by a set of electronics permitting simultaneous acquisition of near-field reflection and shear force topographic images. (Shear force feedback is described in E. Betzig, P. L. Finn, and J. S. Weiner, *Appl. Phys. Lett.* 60, 2484 (1992). Low frequency power fluctuations in the $Kr^+$ laser necessitated the use of an active circuit employing an acoustooptic modulator to stabilize the 1060 nm fiber laser emission in a bandwidth from DC to about 10 kHz. Consequently, the near-field signal was generated by imparting a small vertical dither motion to the sample (approximately 10 nm peak-to-peak) at a somewhat higher frequency (about 36 kHz) and demodulating the resultant AC signal imposed on the fiber laser emission with a lock-in amplifier.

Figure 2:
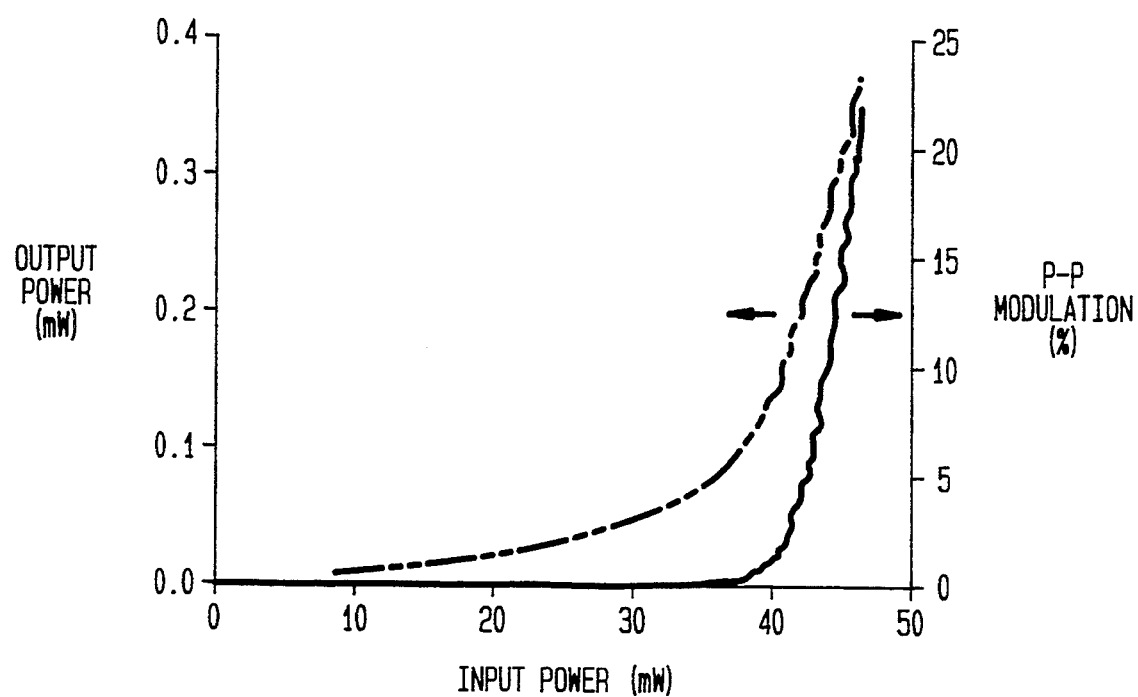
FIG. 2 is a graph showing how the output of an illustrative fiber laser probe depends upon the input power. The illustrative probe was placed within about 10–20 nm of a reflective gold surface and vertically oscillated with a peak-to-peak amplitude of about 10 nm. The upper curve of the figure shows the DC output power of the probe, and the lower curve shows the near-field-induced AC modulation.
Figure 3:
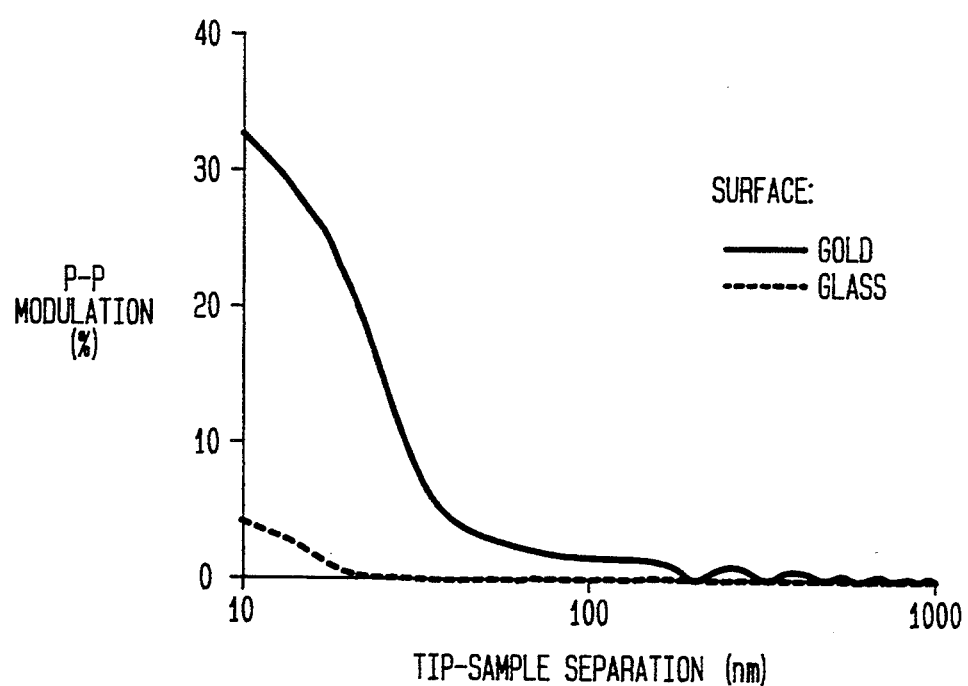
FIG. 3 is a graph showing how the induced AC modulation depends upon the separation between the probe tip and a highly reflective gold surface (upper curve) and a less reflective glass surface (lower curve).

As shown in FIG. 2, the induced AC signal was essentially zero at pump power levels below threshold, but rose rapidly thereafter to become a significant fraction of the total laser output power. For example, we observed a modulation of 22% at an output power of 0.37 mW. This modulation amplitude corresponds to $4.3 \times 10^{14}$ photons/sec received at the detector. Together with the observed sensitivity of this signal to both the sample reflectivity and the tip-to-sample separation demonstrated in FIG. 3, these results suggest that data encoded as reflective or topographic bits will be readable at rates substantially greater than 1 MHz.

Figure 5:
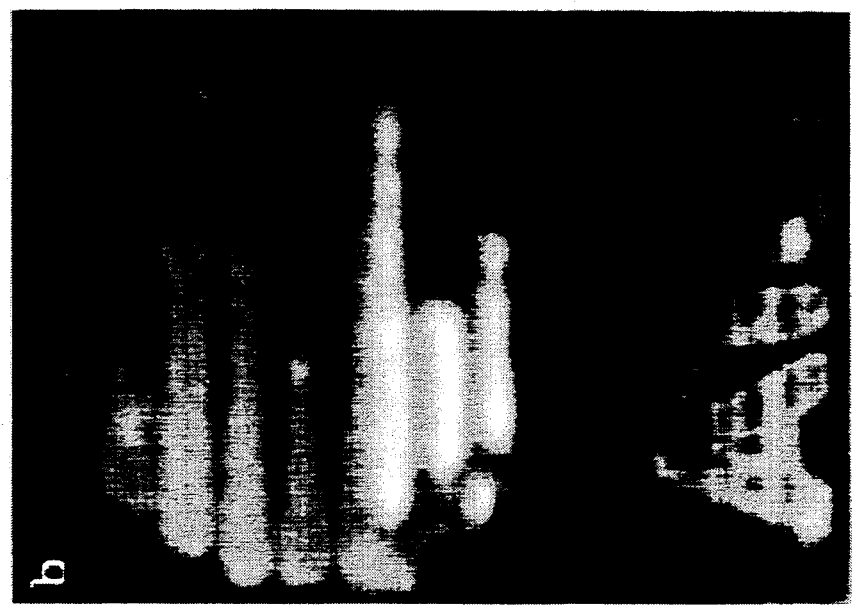
FIG. 5 is a shear-force image of the test pattern of FIG. 4. This image was obtained concurrently with the image of FIG. 4.
Figure 4:
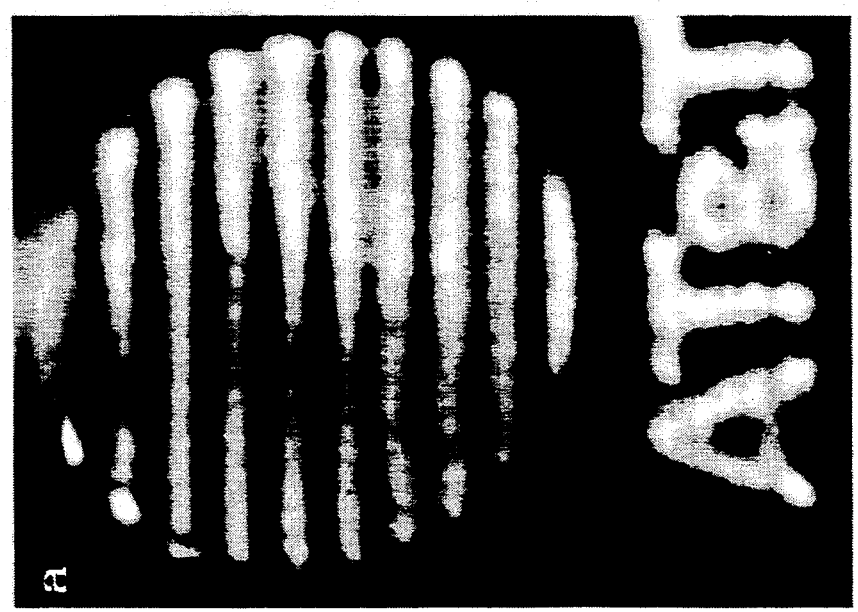
FIG. 4 is an NSOM image of a chromium test pattern formed on a glass substrate. The image was made using a fiber laser probe according to the invention in one embodiment.

To evaluate spatial resolution, we prepared a test pattern consisting of 11-nm-thick chromium features on a glass substrate using electron beam lithography. We used NSOM and shear force microscopy to produce the optical and shear-force images shown, respectively, in FIGS. 4 and 5. It is desirable to compare these images when measuring resolution because the topographic data from the shear force signal can couple into the near-field image, resulting in the spurious introduction of high-spatial-frequency information. This is particularly true for the fiber laser probe, where the sensitivity of the near-field signal to the aperture-to-sample separation is very high. Because the images of FIGS. 4 and 5 differ in significant respects, these figures provide assurance that the optical signal is being evaluated directly. In particular, the apparent line widths are considerably larger in the shear force image, since they are determined by a convolution of the true line width with the outer, metallized diameter of the probe, whereas the near-field widths result from a convolution of the true line width with the considerably smaller diameter of the aperture. Thus, we have concluded that the data in FIG. 4 demonstrate a resolution of 150 nm or better (i.e., 150 nm is the mean line spacing within the pattern), and in fact contain information, not exactly correlated with FIG. 5, at spatial frequencies that correspond to a resolution of 100 nm or better. This is entirely consistent with the 130–150 nm aperture size used in the experiments described here.

Our experimental results imply that if the signal-to-noise ratio is limited only by shot noise, data can be read (from, e.g., a reflective phase-change medium) at packing densities of about 29 $Gbit/in^2$ and speeds of about 50 Mbit per second. (This assumes a power signal-to-noise ratio of about 25 dB, and contrast that is about half that obtained in our laboratory experiments.)

Consequently, we have found that the major limitation on the bandwidth of our hybrid probe is imposed by the relaxation oscillation frequency $f_{rlx}$ of the laser. That is, the time required for the pump beam to establish a population inversion is much greater than the time needed for the population inversion to decay by stimulated emission. This results in a limit $f_{rlx}$ on the maximum frequency at which the output power can be modulated, given approximately by the following theoretical expression:

$$f_{rlx} = \frac{1}{2\pi} \sqrt{\frac{c(\ln \sqrt{R_1 R_2})(1-r)}{nL\tau}}. \quad (1)$$

For a typical NSOM probe, the cavity length $L \approx 70$ cm, the refractive index $n \approx 1.5$, the $Nd^{3+}$ spontaneous emission lifetime $\rho \approx 500\mu s$, the ratio of pump power during normal operation to that at threshold $r \approx 1.15$, and the reflectivities at the cleaved and tapered ends of the cavity are $R_1 \approx 0.04$ and $R_2 \approx 0.01$, respectively. These values yield $f_{rlx} \approx 92$ kHz, resulting in a limit on the read rate far lower than would be anticipated on the basis of shot noise considerations alone.

Figure 6:
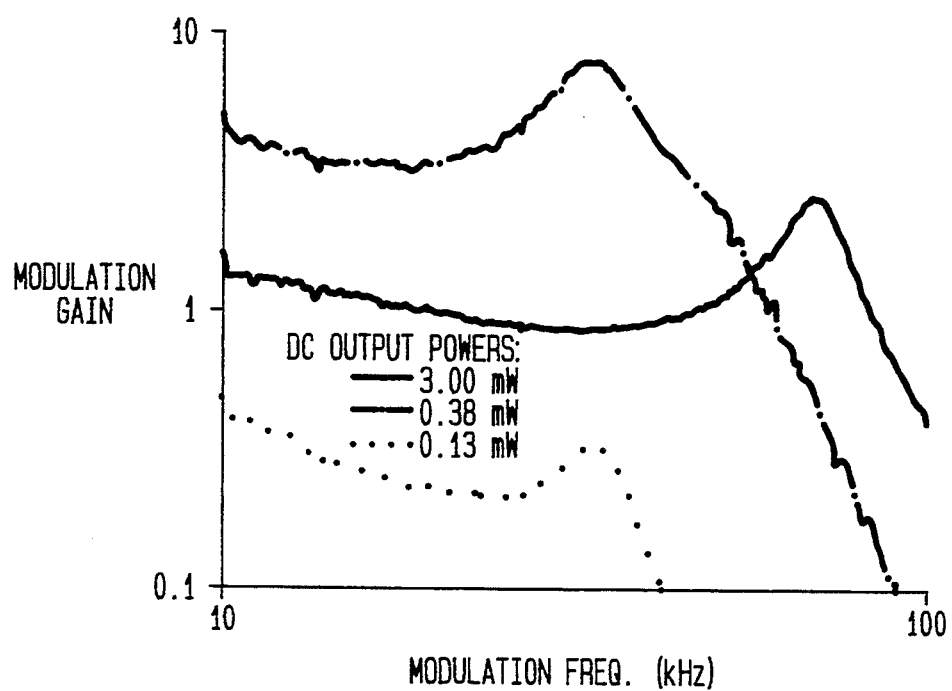
FIG. 6 is a graph showing how the modulation gain of an illustrative fiber laser probe depends upon the modulation frequency. The modulation gain is expressed as percentage peak-to-peak output modulation, normalized to a 2% peak-to-peak variation in pump power. Three curves are shown, corresponding to three different DC output power levels.

We determined the frequency response of the probe by plotting the normalized output power modulation induced by a small AC variation in the pump power from 10–100 kHz, as shown in FIG. 6. For all three of the output power levels indicated, $f_{rlx}$ is of the same order as predicted above. Furthermore, the sensitivity beyond $f_{rlx}$ falls with a very steep slope of about 15 dB/octave. Some improvement in $f_{rlx}$ is achieved at higher power levels in accordance with Equation 1, but even 3.0 mW, as used for the curve with the fastest response, is sufficient to result in heat induced damage to the probe. At a more conservative (and indeed typical) operating power of 0.38 mW, $f_{rlx} \approx 34$ kHz, which explains the choice of the vertical dither frequency used in the experimental runs of FIGS. 2-5.

It should be noted, with reference to FIG. 6, that the gain peaking that occurs at $f_{rlx}$ can be exploited to achieve optimal sensitivity. The modulation gain at all frequencies below $f_{rlx}$ is somewhat better at 0.38 mW than at 3.0 mW, because it is closer to the point of optimum sensitivity along the threshold curve. At an even lower power of 0.12 mW, however, the gain rapidly diminishes, since it must ultimately vanish in the limit where threshold is reached.

As noted, above, one way to exploit this gain peaking is to modulate the separation between the probe and the sample surface at or near the frequency $f_{rlx}$. An alternate method is to modulate the pump power of the laser at or near this frequency. Yet another method is possible where the probe is to be used to read a pattern impressed on the sample surface, such as an array of bits of stored data in an optical or magneto-optical data storage medium. In such a case, scanning of the sample can be carded out such that successive bits (or other surface features) pass beneath the probe with a frequency at or near $f_{rlx}$.

Several schemes are envisaged for improving the bandwidth of the hybrid probe. For example, with suitably high doping and a sufficiently short cavity, $f_{rlx}$ can be increased substantially. Indeed, pulsed operation at a 2.5 MHz repetition rate has already been demonstrated in a 1 cm long $Nd^{3+}$ doped fiber laser. (See, e.g., L. A. Zenteno, E. Snitzer, H. Po, R. Tumminelli, and F. Hakimi, *Opt. Lett.* 14, 671 (1989).) Second, other laser systems with much higher $f_{rlx}$ can be used in place of fibers. For example, we believe that a passive NSOM probe can be combined with a semiconductor diode laser to form a system capable of both high speed and high resolution. In this case, sensitivity will be a more important issue than bandwidth, since diode lasers have $f_{rlx}$ values in the GHz regime.

Figure 7:
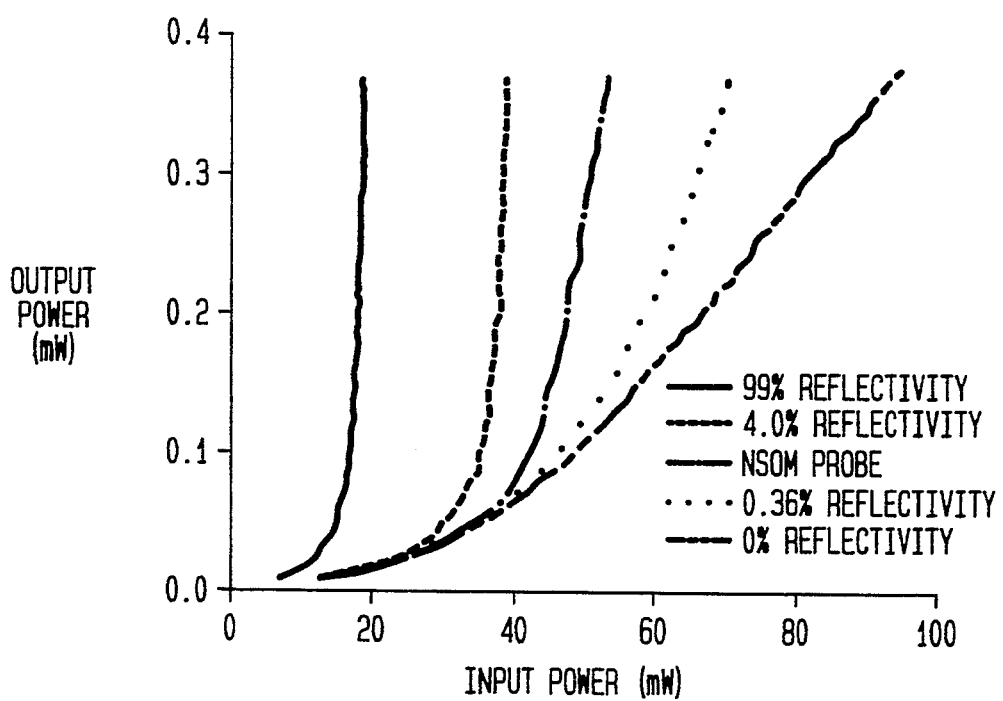
FIG. 7 is a graph showing how the output power of a fiber laser depends upon the input pump power. Five curves are shown, each representing different end-reflector conditions. The middle curve represents an illustrative, fiber-laser NSOM probe.

We have estimated, from data such as those displayed in FIG. 7, that the effective reflectivity at the near-field end of the cavity in a typical one of our fiber laser probes is about 1%. Such a low reflectivity is due to the fact that the taper scatters most of the back reflected energy into the cladding rather than the core. The large sensitivity to near-field perturbations then arises from a redirection of a small part of this scattered light back into the gain medium and/or from a small change in the phase of the reflected energy. We believe that it will be desirable to maintain these characteristics when developing any new hybrid transducer combining a laser and near-field probe.

The exemplary probes described above were coextensive with optical fiber lasers. However, it should be noted that such a probe will typically exhibit gain only in an initial portion, and will not exhibit substantial gain in the neighborhood of the probe tip. This will generally be true even if the probe is uniformly doped with optically emissive ions (provided the total length exceeds the absorption length for pump radiation). Thus, a terminal portion of the optical cavity will typically behave as a passive, rather than as an active, cavity with respect to laser emission.

Figure 8:
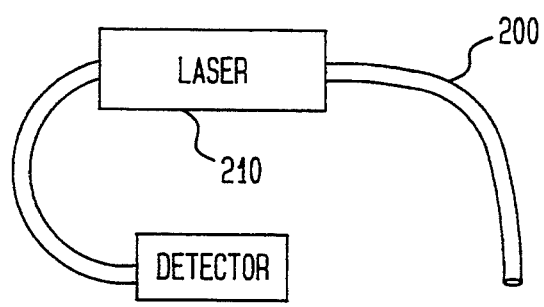
FIG. 8 is a schematic diagram of an alternate embodiment of the invention, in which a passive near-field probe is attached to an emissive face of a laser.

In fact, as noted above, an emissive face of a laser or other light source can be coupled to the sample through a purely passive near-field probe attached to the emissive face. Such a combined assembly is shown in FIG. 8. The reflectivity of the interface between, e.g., laser diode 200 and passive probe 210 can be varied from near zero to near 100% by, for example, applying appropriate anti-reflective coatings. This reflectivity affects the optical feedback, and thus affects the operation of the light source. For example, when the reflectivity is high enough for the diode to lase even without the attached probe, the combined assembly may be described as a laser coupled to a passive cavity external to the laser itself. On the other hand, the reflectivity may be too low for the isolated diode to lase. In that case, the combined assembly may be described as an optical amplifier coupled to an external, passive cavity or cavity portion.

It should be noted that the reflectivity at the probe tip can be selected to maximize the sensitivity of the probe. For example, the tip reflectivity of a drawn optical fiber probe can be changed by changing the material with which the tip is coated.

Figure 9:
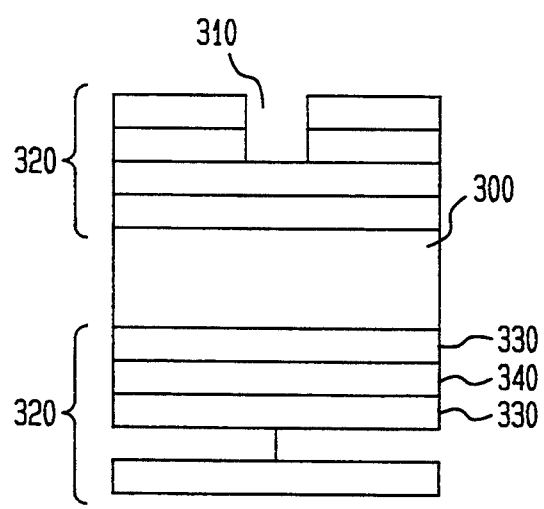
FIG. 9 is a schematic diagram of a light source useful in connection with an alternate embodiment of the invention. This light source comprises a fluorescent body situated within a Fabry-Perot cavity.

It will be appreciated that the optical output characteristics of still other kinds of light sources can be altered by the near field of a sample surface. It is intended for these, too, to be included within the scope of the invention. By way of example, a suitable light source may be provided, as shown in FIG. 9, by a fluorescent body 300 contained within a Fabry-Perot resonator of such a small length that the fluorescent emission of the body is substantially confined to a single resonant mode. We expect that the tuning of such a cavity will be sensitive to the near field of the sample surface sensed, for example, through a sub-wavelength aperture 310 in one of the end-reflectors 320 of the cavity. Changes in the tuning of the cavity will result in detectable changes in, e.g., the intensity of the fluorescent emission. Fluorescent body 300 is exemplarily a half-wavelength-thick layer of silicon dioxide doped with a suitable fluorescent species such as erbium, and enclosed within distributed Bragg reflectors comprising alternate, quarter-wavelength-thick layers 330, 340 of silicon and silicon dioxide. Alternatively, the fluorescent body is a gallium arsenide quantum well embedded in the center of a half-wavelength layer of AlGaAs, and layers 330 and 340 comprise AlGaAs and AlAs in alternation. These and similar structures are readily fabricated by well-known methods, such as vacuum evaporation and molecular beam epitaxy.

In at least some cases, it may be useful to detect imaging signals by frequency modulation rather than by amplitude modulation, either by optical heterodyning or by passively mode locking the laser-probe system. Such methods are expected to retain sensitivity well beyond threshold. Optical heterodyning is a useful detection method where what is modulated is the frequency $\nu$ of the laser radiation. By contrast, the modelocking method leads to modulation of the output pulse frequency $f_{ml}$ of the laser. Both of these frequencies can be affected by effective changes in the phase of the reflected wave from the probe tip as the tip is moved relative to the sample surface or as the reflectivity of the sample surface changes.

As shown in FIG. 10, a laser exemplarily formed by near-field optical microscope tip 400, gain medium 410 and output coupler 420 emits light into laser frequency measuring system 430 which is, for example, an optical heterodyne detector. As the reflectivity or height of the sample surface changes, consequent changes in the laser frequency $\nu$ will be detected.

In the alternative detection scheme of FIG. 11, saturable absorber 500 is added to the cavity to cause passive modelocking. Passive modelocking causes the laser to emit a train of optical pulses whose repetition frequency $f_{ml}$ depends on the optical length of the laser cavity. Thus, as the reflectivity or the height of the sample surface is changed, the effective optical length of the cavity is also changed, and this change will result in a change in the frequency $f_{ml}$. The modelocked pulse train is fed to pulse-frequency measuring system 510. A suitable such system is described, e.g., in W. H. Knox, "In situ Measurement of Complete Intracavity Dispersion in an Operating Ti:Sapphire Femtosecond Laser," *Optics Letters* 17, (1992) 514–516. This article by Knox also demonstrates explicitly that the method of measuring the pulse repetition rate from a passively modelocked laser is very sensitive to optical processes in laser cavities. Significantly, the pulse repetition frequency is readily chosen to be within a range that can be measured electronically.

What is claimed is:

1. Apparatus for collecting information from a surface of a sample, comprising:
   a) a light source that comprises a first optical cavity, and that further comprises an emissive face portion for emitting therethrough radiation from the first optical cavity;

b) means for situating the emissive face portion near the sample surface such that the optical cavity is reflectively coupled to a spot on the sample surface, relative to at least one wavelength λ of radiation emitted from the optical cavity;

c) means for scanning the spot over a portion of the sample surface; and d) means for detecting changes in an output characteristic of the light source,

CHARACTERIZED IN THAT:

e) the emissive face portion has a maximum extent L in at least one dimension parallel to the sample surface that is less than λ; and f) the situating means, in use, to situate the emissive face portion at a distance from the sample surface that is less than or approximately equal to L.

2. Apparatus of claim 1, wherein:
a) the light source comprises a glass waveguiding body; and
b) at least a portion of said body is doped with a fluorescent species such that said doped portion can emit radiation when appropriately stimulated by pump radiation.

3. Apparatus of claim 2, wherein:
a) the glass waveguiding body is an optical fiber having a tapered terminal portion and an end thereof; and
b) the emissive face portion is defined in the end of the tapered terminal portion.

4. Apparatus of claim 1, wherein the light source comprises a laser, the optical cavity is internal to the laser, and at least a portion of the cavity comprises a gain region of the laser.

5. Apparatus of claim 1, wherein: the light source comprises a laser having a second optical cavity internal thereto; the first optical cavity is external to the laser; and the first optical cavity is optically coupled to the second optical cavity.

6. Apparatus of claim 5, wherein: the light source comprises an optical fiber optically coupled to the laser and having a tapered end portion distal the laser; the emissive face portion is defined in the tapered end portion; and the first optical cavity is defined within the optical fiber.

7. Apparatus of claim 1, wherein: the light source comprises an optical amplifier having a second optical cavity internal thereto; the first optical cavity is external to the optical amplifier; and the first optical cavity is optically coupled to the second optical cavity.

8. Apparatus of claim 7, wherein: the light source comprises an optical fiber optically coupled to the optical amplifier and having a tapered end portion distal the optical amplifier; the emissive face portion is defined in the tapered end portion; and the first optical cavity is defined within the optical fiber.

9. Apparatus of claim 1, wherein the light source comprises a fluorescent body situated within the first optical cavity.

10. Apparatus of claim 9, wherein the first optical cavity has a length of approximately $$\frac{\lambda}{2}.$$

11. Apparatus of claim 1, wherein: the light source comprises a laser and means for modelocking the laser at a variable modelocking frequency $f_{ml}$; and the detecting means comprise means for detecting changes in $f_{ml}$.

12. Apparatus of claim 1, wherein: the light source comprises a laser capable of emitting radiation at the wavelength λ and frequency $$\nu = \frac{c}{\lambda},$$

where c is the vacuum velocity of light; and the detection means comprises means for detecting changes in $\nu$.

13. Apparatus of claim 1, wherein the detecting means comprise means for detecting changes in the intensity of radiation emitted from the light source.

14. A method for collecting information from a surface of a sample, comprising:
a) operating a light source having an optical cavity such that electromagnetic radiation is present in the optical cavity, and a portion of the radiation in the optical cavity is emitted through an emissive face portion;
b) during (a), situating the emissive face portion near the sample surface such that the optical cavity is reflectively coupled to a spot on the sample surface, relative to at least one wavelength λ of radiation emitted by the light source;
c) during (b), scanning the spot over a portion of the sample surface; and
d) during (c), detecting changes in an output characteristic of the light source.

CHARACTERIZED IN THAT step (b) is carried out such that:

e) the spot has a maximum extent L in at least one dimension parallel to the sample surface that is less than λ; and 'f) the emissive face portion is situated at a distance from the sample surface that is less than or approximately equal to L.

15. The method of claim 14, wherein: the light source is capable of emitting radiation at a frequency $$\nu = \frac{c}{\lambda},$$

where c is the vacuum velocity of light; and (d) comprises detecting changes in $\nu$.

16. The method of claim 14, wherein: the light source comprises a laser; (a) comprises modelocking the laser such that pulses of radiation are emitted at a modelocking frequency $f_{ml}$; and (d) comprises detecting changes in $f_{ml}$.

17. The method of claim 14, wherein: the light source comprises a laser having a relaxation oscillation frequency $f_{rlx}$; the method further comprises, during (a), the step of modulating, at a modulation frequency, the intensity of radiation in the optical cavity; and (d) comprises detecting an intensity of radiation emitted from the laser, and detecting changes in the AC component of said intensity at the modulation frequency.

18. The method of claim 17, wherein the modulating step comprises varying the separation between the sample surface and the emissive face portion.

19. The method of claim 17, wherein the light-source-operating step comprises pumping the laser at a pump power level, and the modulating step comprises modulating the pump power level.

20. The method of claim 17, 18, or 19, wherein the modulation frequency is approximately equal to $f_{rlx}$.

21. The method of claim 14, wherein: the light source comprises a laser having a relaxation oscillation frequency $f_{rlx}$; the method further comprises providing a sample having a pattern impressed on a surface thereof, said pattern having spatially periodic reflectivity variations; step (c) comprises scanning the spot over the pattern such that said reflectivity variations modulate radiation in the optical cavity at a modulation frequency; and step (c) is carried out at a scan rate selected, relative to the periodicity of said reflectivity variations, such that the modulation frequency is approximately equal to $f_{rlx}$.

22. The method of claim 14, wherein the detecting step comprises detecting changes in the intensity of radiation emitted from the light source.

* * * * *